United States Patent [19]

Higashimata et al.

[11] Patent Number: 4,900,100
[45] Date of Patent: Feb. 13, 1990

[54] ANTI-SKID BRAKE CONTROL SYSTEM WITH CAPABILITY OF ELIMINATING INFLUENCE OF NOISE IN DERIVATION OF WHEEL ACCELERATION DATA

[75] Inventors: Akira Higashimata, Kanagawa; Yasuki Ishikawa, Tokyo; Yoshiki Yasuno; Takeshi Fujishiro, both of Kanagawa, all of Japan

[73] Assignee: Nissan Motor Company Limited, Yokohama, Japan

[21] Appl. No.: 316,742

[22] Filed: Feb. 28, 1989

[30] Foreign Application Priority Data

Feb. 29, 1988 [JP] Japan .................................. 63-46695
Feb. 29, 1988 [JP] Japan .................................. 63-46696

[51] Int. Cl.$^4$ .............................................. B60T 8/58
[52] U.S. Cl. ..................................... 303/100; 303/103; 303/104; 364/426.02
[58] Field of Search ......................... 303/100, 102-111, 303/96, 97, 95, 94, 99, 98; 188/181; 364/426.02

[56] References Cited

U.S. PATENT DOCUMENTS

| | | | |
|---|---|---|---|
| 3,235,036 | 2/1966 | Meyer et al. | 303/104 X |
| 3,401,983 | 9/1968 | Reid, Jr. | 303/107 X |
| 3,508,795 | 4/1970 | Scharlack et al. | 303/104 |
| 3,547,500 | 12/1970 | Riordan | 303/104 |
| 3,656,816 | 4/1972 | Schlitz et al. | 303/104 |
| 3,744,852 | 7/1973 | Riordan | 303/104 |
| 3,790,227 | 2/1974 | Dozier | 303/105 X |
| 3,863,993 | 2/1975 | Fleischer et al. | 303/106 |
| 3,871,715 | 3/1975 | Hikida et al. | 303/109 |
| 3,874,741 | 4/1975 | Schnaibel et al. | 303/106 |
| 3,904,251 | 9/1975 | Hikida et al. | 303/109 |
| 3,922,022 | 11/1975 | Ochiai | 303/106 |
| 3,988,042 | 10/1976 | Aoki et al. | 303/108 |
| 4,037,882 | 7/1977 | Taylor | 303/107 |
| 4,039,227 | 8/1977 | Sivulka | 303/97 |
| 4,043,608 | 8/1977 | Bourg et al. | 303/104 |
| 4,076,332 | 2/1978 | Taylor et al. | 303/107 X |
| 4,275,933 | 6/1981 | Miyaka | 303/106 |
| 4,408,290 | 10/1983 | Kubo et al. | 364/566 |
| 4,570,560 | 2/1986 | Hubele | 112/273 |
| 4,597,052 | 6/1986 | Matsuda | 364/550 |
| 4,637,663 | 1/1987 | Matsuda | 303/106 |
| 4,651,281 | 3/1987 | Masaki et al. | 303/103 X |
| 4,656,588 | 4/1987 | Kubo | 364/426 |
| 4,660,146 | 4/1987 | Kubo | 364/426 |
| 4,662,686 | 5/1987 | Matsuda | 303/106 |
| 4,663,715 | 5/1987 | Kubo | 303/105 X |
| 4,663,716 | 5/1987 | Kubo | 303/95 X |
| 4,664,453 | 5/1987 | Kada et al. | 303/104 X |
| 4,665,491 | 5/1987 | Kubo | 364/424 |
| 4,667,176 | 5/1987 | Matsuda | 340/52 |
| 4,669,045 | 5/1987 | Kubo | 364/426 |
| 4,669,046 | 5/1987 | Kubo | 364/426 |
| 4,674,049 | 6/1987 | Kubo | 364/426 |
| 4,674,050 | 6/1987 | Kubo | 364/426 |
| 4,680,713 | 7/1987 | Kubo | 364/426 |
| 4,680,714 | 7/1987 | Kubo | 364/426 |
| 4,682,295 | 7/1987 | Kubo | 364/426 |
| 4,683,537 | 7/1987 | Matsuda | 364/426 |
| 4,693,522 | 9/1987 | Wupper et al. | 303/105 |
| 4,704,684 | 11/1987 | Kubo | 364/426 |
| 4,715,662 | 12/1987 | Zanten et al. | 303/100 X |
| 4,718,013 | 1/1988 | Kubo | 364/426 |
| 4,763,260 | 8/1988 | Sakuma et al. | 303/100 X |
| 4,776,644 | 10/1988 | Arikawa | 303/104 X |
| 4,780,818 | 10/1988 | Kubo | 303/95 X |
| 4,783,127 | 11/1988 | Kade et al. | 303/100 |
| 4,807,133 | 2/1989 | Shimanuki et al. | 303/105 X |
| 4,836,619 | 6/1989 | Muto | 303/105 X |

Primary Examiner—Douglas C. Butler
Attorney, Agent, or Firm—Foley & Lardner, Schwartz, Jeffery, Schwaab, Mack, Blumenthal & Evans

[57] ABSTRACT

An anti-skid brake control system includes a device for detecting the friction level of a road surface. The system performs mutually different modes of arithmetic operation for deriving wheel acceleration data on the basis of wheel speed monitoring data. Respective modes of arithmetic operations are provided different levels of response characteristics and noise elimination levels adapted for road friction levels. The system selects one of the arithmetic operation modes for deriving the wheel acceleration data depending upon the friction level on the road surface.

19 Claims, 10 Drawing Sheets

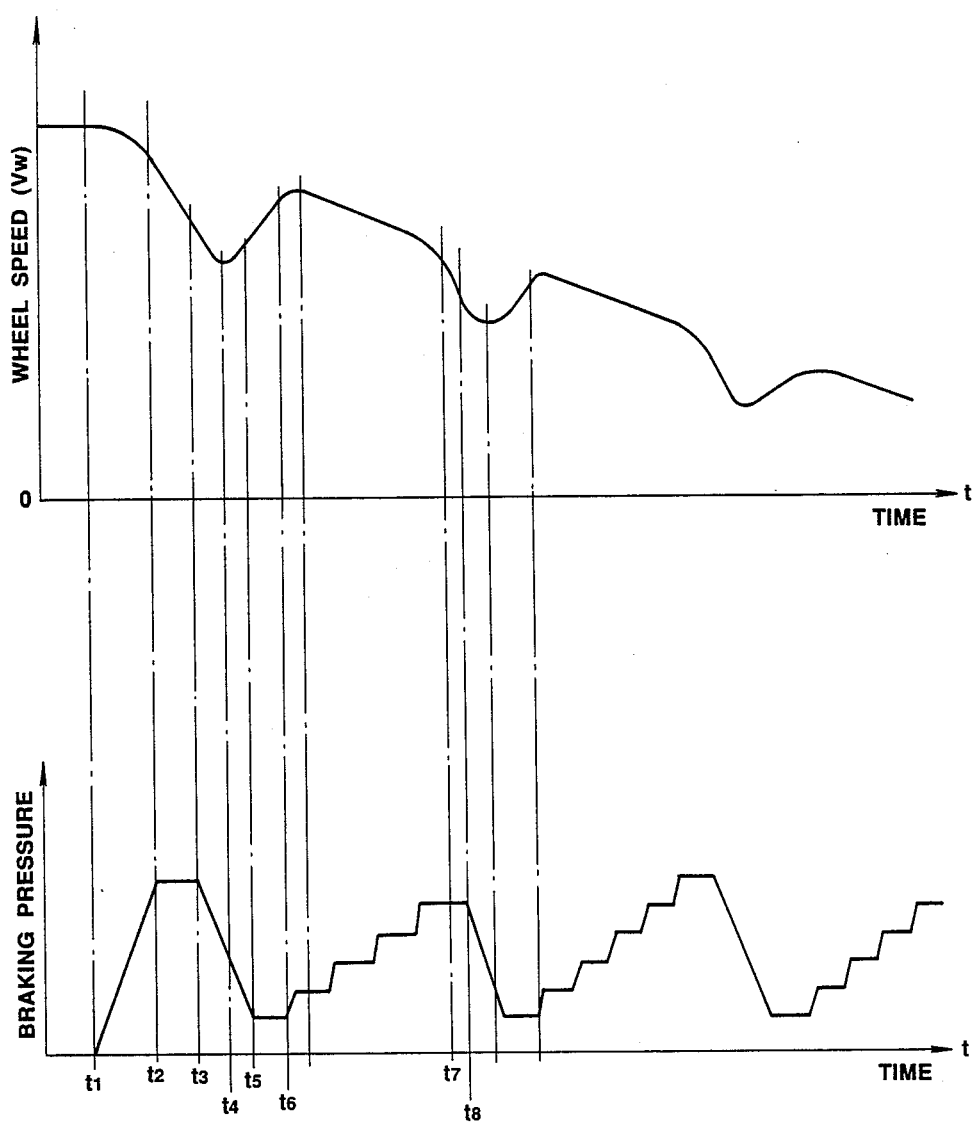

ANTI-SKID BRAKE CONTROL SYSTEM WITH CAPABILITY OF ELIMINATING INFLUENCE OF NOISE IN DERIVATION OF WHEEL ACCELERATION DATA

BACKGROUND OF THE INVENTION

1. Field of the Invention

The present invention relates generally to an anti-skid brake control system for an automotive vehicle which can precisely control a skid control cycle for optimizing vehicular braking performance. More specifically, the invention relates to noise elimination in derivation of wheel acceleration as an important parameter for precisely controlling a skid cycle in an anti-skid brake control system.

2. Description of the Background Art

There have been conventionally proposed various anti-skid brake control systems. For example, Japanese Patent Second (examined) Publication (Tokko) Showa 51-6305 disclose for an anti-skid brake control system. In the disclosed system, anti-skid control is generally initiated in response to a negative wheel acceleration which is a wheel deceleration hereafter simply referred to as wheel acceleration including positive values and negative values, for avoiding confusion by reference to both acceleration and deceleration, decreasing across a predetermined wheel deceleration threshold. The anti-skid control is performed over one or more skid control cycles in which braking pressure in a wheel cylinder is controlled according to a predetermined schedule for maintaining the braking pressure close to lock pressure so as to optimize braking performance. In most cases, the wheel deceleration threshold is set in view of desired maximum wheel deceleration on a high friction road. This causes overshooting in braking pressure control because of the presence of lag time in detection of wheel acceleration. Such overshooting tends to cause degradation of braking performance by leading the wheel into locking due to excessive braking pressure.

In order to solve this problem in the prior art, Japanese Patent Second (examined) Publication (Tokko) Showa 53-14708 discloses an anti-skid brake control system which is provided mutually different wheel deceleration thresholds to be selectively used according to the friction level of the road surface. Though such an approach may reduce the magnitude of overshooting and thus reduce the possibility or the magnitude of wheel locking for improving vehicular braking performance, it still leaves various problems unsolved. For instance the aforementioned prior proposed system does not account for the influence of noise superimposed on wheel speed data as base data for deriving the wheel acceleration. Therefore, avoidance of the influence of noise in the derivation of wheel acceleration for improving the level of precision in anti-skid control is necessary.

SUMMARY OF THE INVENTION

Therefore, it is an object of the present invention to provide an anti-skid brake control system which can achieve both satisfactory high response and the avoidance of influence of noise which can be superimposed on wheel speed monitoring data.

In order to accomplish the aforementioned and other objects, an anti-skid brake control system, according to the present invention, includes means for detecting the friction level of a road surface. The system performs mutually different modes of arithmetic operation for deriving wheel acceleration data on the basis of wheel speed monitoring data. Respective modes of arithmetic operations are provided for different levels of response characteristics and noise elimination levels adapted for road friction levels. The systems selects on the arithmetic operation modes for deriving the wheel acceleration data depending upon the friction level on the road surface.

According to one aspect of the invention, an anti-skid brake control system for an automotive vehicle, comprises:

a fluid circuit including a fluid pressure source and a wheel cylinder for generating a braking force for decelerating a wheel;

pressure control valve means disposed in the fluid circuit for controlling braking pressure generated in the wheel cylinder, the pressure control valve means operating to increase the braking pressure in the wheel cylinder in a first mode position and to decrease the braking pressure in the wheel cylinder in a second mode position;

first sensor means for monitoring a rotation speed of the wheel for producing a wheel speed indicative signal;

second sensor means for monitoring a road friction indicative parameter for producing a friction indicative signal;

first arithmetic means for deriving first wheel acceleration indicative data, the first arithmetic means being provided with a first higher sensitivity with respect to variation of the wheel speed indicative signal value;

second arithmetic means for deriving a second wheel acceleration indicative data, the first arithmetic means being provided with a second lower sensitivity with respect to variation of the wheel speed indicative signal value;

third arithmetic means detecting friction conditions on the road surface to select one of the first and second wheel acceleration indicative data for outputting selected wheel acceleration indicative data; and fourth arithmetic means, receiving the wheel speed indicative data and the selected wheel acceleration, for processing the input data for selecting one of a first mode in which the pressure control valve means is operated in the first mode position and a second mode in which the pressure control valve means is operated in the second mode position.

According to another aspect of the invention, an anti-skid brake control system for an automotive vehicle comprises:

a fluid circuit including a fluid pressure source and a wheel cylinder for generating a braking force for decelerating a wheel;

pressure control valve means disposed in the fluid circuit for controlling braking pressure generated in the wheel cylinder, the pressure control valve means operating to increase the braking pressure in the wheel cylinder in a first mode position, to decrease the braking pressure in the wheel cylinder in a second mode position, and to hold the braking pressure in the wheel cylinder constant in a third mode;

first sensor means for monitoring a rotation speed of the wheel for producing a wheel speed indicative signal;

a second sensor means for monitoring a road friction indicative parameter for producing a friction indicative signal;

first arithmetic means for deriving first wheel acceleration indicative data, the first arithmetic means being provided with a first high sensitivity with respect to variation of the wheel speed indicative signal value;

second arithmetic means for deriving second wheel acceleration indicative data, the first arithmetic means being provided with a second lower sensitivity with respect to variation of the wheel speed indicative signal value;

third arithmetic means detecting friction conditions on the road surface to select one of the first and second wheel acceleration indicative data for outputting selected wheel acceleration indicative data; and fourth arithmetic means, receiving the wheel speed indicative data, the selected wheel acceleration indicative data and vehicle body speed representative data for processing the input data for selecting one of a first mode in which the pressure control valve means is operated in the first mode position and a second mode in which the pressure control valve means is operated to the second mode position and a third mode in which the pressure control valve is operated to the third mode.

According to a further aspect of the invention, an anti-skid brake control system for an automotive vehicle, comprises:

a fluid circuit including a fluid pressure source and a wheel cylinder for generating a braking force for decelerating a wheel;

at least first, second and third pressure control valve means disposed in the hydraulic circuit for controlling braking pressures generated in a respectively associated one of first, second and third wheel cylinders, each of the first, second and third pressure control valve means operating to increase the braking pressure in the associated one of the first, second and third wheel cylinders in a first mode, to decrease the braking pressure in the wheel cylinder in a second mode and to hold the braking pressure in the wheel cylinder at a constant value in a third mode;

a first sensor means for monitoring rotation speed of the first vehicular wheel to which the first wheel cylinder is associated to produce a first wheel speed indicative signal;

a second sensor means for monitoring rotation speed of the second vehicular wheel to which the second wheel cylinder is associated to produce a second wheel speed indicative signal;

a third sensor means for monitoring rotation speed of the third vehicular wheel to which the third wheel cylinder is associated to produce a third wheel speed indicative signal;

a fourth sensor means for monitoring a longitudinal acceleration exerted on a vehicle body for producing a longitudinal acceleration indicative signal;

first arithmetic means for deriving first wheel acceleration indicative data with respect to a respective one of the first, second and third wheels on the basis of a respectively corresponding one of the first, second and third wheel speed indicative signals, the first arithmetic means being provided with a first higher sensitivity with respect to variation of the wheel speed indicative signal value;

second arithmetic means for deriving a second wheel acceleration indicative data with respect to a respective one of the first, second and third wheels on the basis of a respectively corresponding one of the first, second and third wheel speed indicative signals, the first arithmetic means being provided with second lower sensitivity with respect to variation of the wheel speed indicative signal value;

third arithmetic means for selecting one of the first, second and third wheel speed indicative signals having the greatest value, integrating the longitudinal acceleration indicative signal values and deriving vehicle body speed representative data on the basis of the selected wheel speed indicative signal value and the integrated value;

fourth arithmetic means processing the longitudinal acceleration indicative signal for detecting friction conditions on the road surface so as to select one of the first and second wheel acceleration indicative data for outputting a selected wheel acceleration indicative data; and fifth arithmetic means, receiving the wheel speed indicative data, the selected wheel acceleration indicative data and the vehicle body speed representative data for processing the input data for selecting one of a first mode in which the pressure control valve means is operated in the first mode position, a second mode in which the pressure control valve means is operated to the second mode position and a third mode in which the pressure control valve is operated to the third mode.

The fifth arithmetic means may derive an anti-skid control signal selecting one of each of the first, second and third mode for operating the pressure control valve to a corresponding one of the first, second and third positions according to the following sequence, the fifth arithmetic means deriving the anti-skid brake control signal to order the third mode in response to decreasing of the wheel acceleration across a predetermined deceleration threshold, to order the second mode in response increasing of the wheel slippage across a predetermined wheel slippage threshold, to order the third mode in response to increasing of the wheel acceleration across a predetermined acceleration threshold, and to order the first mode in response to decreasing of the wheel slippage across the vehicle body speed representative data.

The fourth sensor means produces the longitudinal acceleration indicative signal serving as a friction indicative signal which has a value varying between a high level representing high friction condition and low level representing low friction condition, and the third arithmetic means selects the first wheel acceleration indicative data in response to a high level friction indicating signal and selects the second wheel acceleration indicative data in response to a low friction indicating signal.

The fourth arithmetic means compares the longitudinal acceleration indicative signal with a predetermined longitudinal acceleration threshold to produce the high level friction indicative signal when the longitudinal acceleration indicative signal is greater than or equal to the longitudinal acceleration threshold and to produce the low level friction indicative signal otherwise. In the alternative, the fourth arithmetic means includes an averaging means receiving the longitudinal acceleration indicative signal to derive a running average of the longitudinal acceleration indicative signal values and comparing the running average with a predetermined threshold for producing the high level friction indicative signal when the running average is greater than or equal to the threshold and for producing the low level friction indicative signal when the running average is smaller than the threshold.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 5 is a timing chart showing an example of anti-skid brake control operation performed by the first embodiment of the anti-skid brake control system of FIG. 1;

DESCRIPTION OF THE PREFERRED EMBODIMENT

Figure 1:
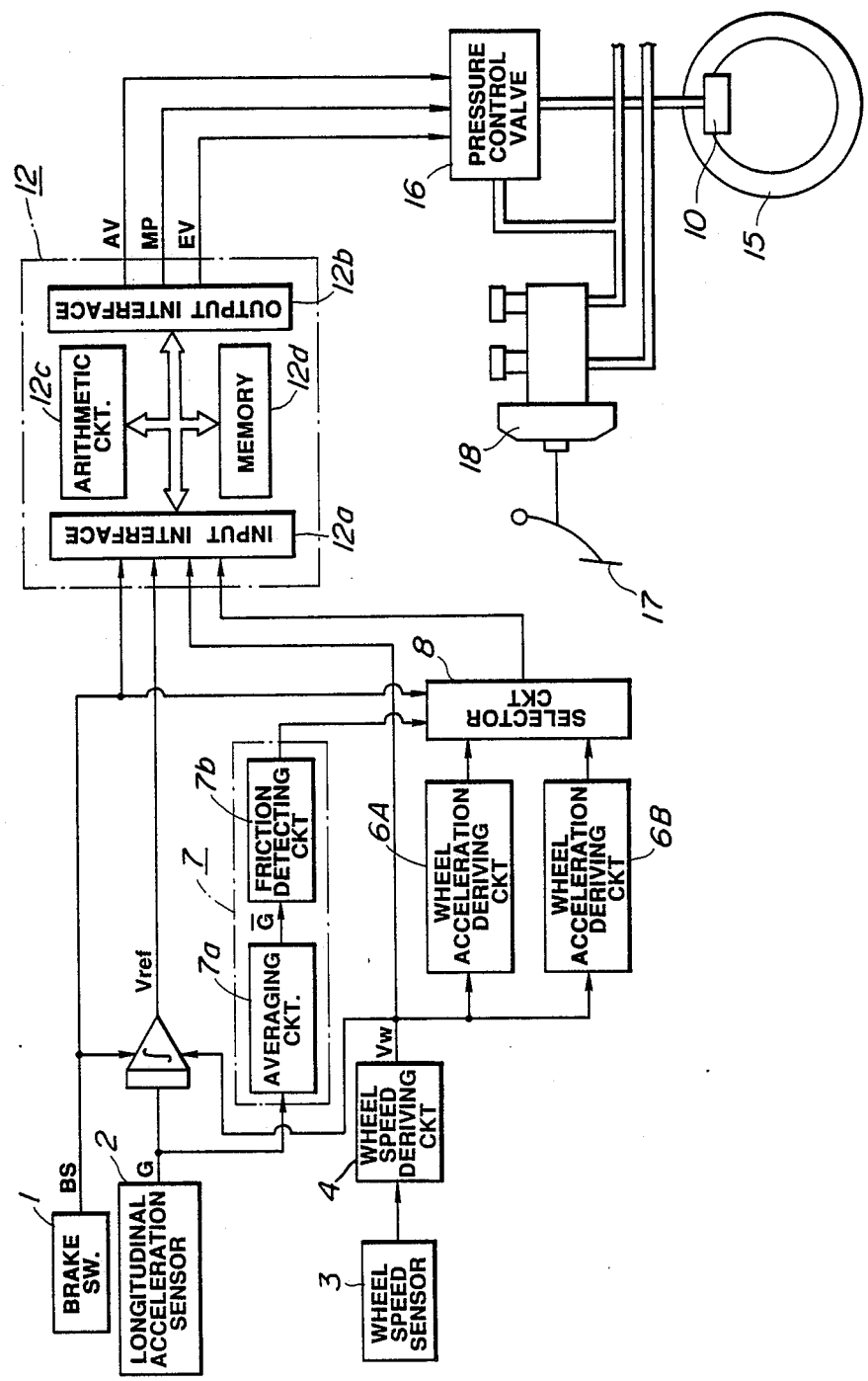
FIG. 1 is a schematic block diagram of the first embodiment of an anti-skid brake control system according to the present invention.

Referring now to the drawings, particularly to FIG. 1, the preferred embodiment of an anti-skid brake control system is associated with a hydraulic brake system. The brake system includes a brake pedal 17, a master cylinder 18 mechanically associated with the brake pedal 17 for building up braking pressure in response to manual input of braking force through the brake pedal, and wheel cylinders 10 of the vehicular brakes for applying braking pressure for respective front-left, front-right, rear-left and rear-right wheels 15. The anti-skid brake control system includes wheel speed sensors 3 respectively monitoring rotation speed of front-left, front-right, rear-left and rear-right wheels 15 to produce wheel speed indicative signals $v_w$. The wheel speed sensor 3 generally comprises a rotor with a plurality of notches arranged on the outer circumference with regular intervals and a proximity switch for detecting respective notches. The wheel speed sensor 3 produces an alternating current signal as the wheel speed indicative signal $v_w$ having a frequency representative of the rotation speed of the wheel. A longitudinal acceleration sensor 22 is also provided for monitoring longitudinal acceleration exerted on a vehicular body and produce a longitudinal acceleration indicative signal Gx. The wheel speed sensors 3 and the longitudinal acceleration sensor 22 are connected to a control circuit including a control unit 12. A brake switch 1 is also connected to the control circuit. The brake switch 1 detects depression of the brake pedal 17 to produce a HIGH level braking state indicative signal BS and maintains the braking state indicative signal LOW level.

The control circuit includes wheel speed indicative data deriving circuits 4 connected to respective wheel speed sensors 3. Each wheel speed indicative data deriving circuit 4 performs frequency-to-voltage (F/V) conversion for the wheel speed indicative signal $v_w$ to form wheel speed indicative analog data having a voltage level representative of the wheel speed as indicated by the frequency of the wheel speed indicative signal $v_w$ of the wheel speed sensor. The wheel speed deriving circuit 4 is connected to the control unit 12 to input the wheel speed indicative analog data $V_w$ thereto. Also, the wheel speed deriving circuit 4 is connected to first and second wheel acceleration deriving circuits 6A and 6B to feed the wheel speed indicative analog data Vw. Respective ones of the first and second wheel acceleration deriving circuits 6A and 6B are designed for sampling wheel speed indicative analog data Vw at given intervals which define sample periods. In the embodiment shown, the first and second wheel acceleration deriving circuits 6A and 6B set the sampling periods in 5 msec for sampling the wheel speed indicative analog data Vw from the wheel speed derivation circuit 4 for deriving the wheel acceleration indicative analog data on the basis of the sampled wheel speed indicative analog data Vw. The first wheel acceleration deriving circuit 6A derives average wheel acceleration data within a predetermined first wheel acceleration deriving period including a given number of sample periods, e.g. 6 sample periods. The average wheel acceleration indicative data derived by the first wheel acceleration deriving circuit 6A will be hereafter represented by "$\alpha_a$". On the other hand, The second wheel acceleration deriving circuit 6B derives second average wheel acceleration indicative data within a second wheel acceleration deriving period including a given number of sample periods, e.g. 12 sample periods. The average wheel acceleration indicative data derived by the second wheel acceleration deriving circuit 6B will be hereafter represented by "$\alpha_b$".

The first and second wheel acceleration deriving circuits 6A and 6B are connected to a selectively establishing connection between the wheel acceleration deriving circuits 6A and 6B and the control unit 12 for feeding a selected one of the first and second average wheel acceleration indicative data $\alpha_a$ and $\alpha_b$ to the latter. The selected on the first and second average wheel acceleration indicative data $\alpha_a$ and $\alpha_b$ will be hereafter referred to as "selected average wheel acceleration indicative data $\alpha$".

The selector circuit 8 is also set for first and second wheel deceleration thresholds $-\alpha a_2$ and $-\alpha b_2$ which are selected, respectively, or a high friction road and a low friction road. The selector circuit 8 selects one of the first and second wheel deceleration thresholds $-\alpha a_2$ and $-\alpha b_2$ to be fed to the control unit 12. The selected one of the first and second wheel deceleration thresholds $-\alpha a_2$ and $-\alpha b_2$ will be hereafter referred to as "selected wheel deceleration threshold $-\alpha_2$".

On the other hand, the longitudinal acceleration sensor 2 is connected to a friction detector 7 and an integration circuit 10. The friction detector 7 comprises an averaging circuit 7a and a friction detecting circuit 7b. The averaging circuit 7a samples the longitudinal acceleration indicative signal over a predetermined sampling period and derives the average value of the sampled longitudinal acceleration indicative values Gx to derive average longitudinal acceleration data $\overline{Gx}$. The friction detecting circuit 7b compares the absolute value of the average longitudinal acceleration data $\overline{Gx}$ with a predetermined longitudinal acceleration threshold Gs for discriminating between high friction road surface conditions and low friction road surface conditions. During braking operation and while the wheel is slipping, the braking force F reacting on the vehicle body from the road surface can be described by:

$$F = M \times N$$

where

M is road/tire friction coefficient; and
N is vertical reaction force.

Assuming the mass weight of the vehicle is m, the longitudinal acceleration exerted on the vehicle body can be described by :

$$F = m \times Gx = M \times N$$

As will be appreciated herefrom, the longitudinal acceleration Gx is proportional to the friction coefficient M. Therefore, by checking the longitudinal acceleration, the friction level on the road surface can be assumed.

The friction detecting circuit 7b then produces a friction level indicative signal $\mu$ which is variable between a HIGH level indicative of a high friction road surface condition and a LOW level indicative of a LOW friction road surface condition. The friction level indicative signal $\mu$ is fed to the selector circuit 8. The selector circuit 8 is responsive to the HIGH friction indicative signal $\mu$ to select the first average wheel acceleration indicative data $\alpha_a$ as the average wheel acceleration indicative data $\alpha$, and the first wheel deceleration threshold $-\alpha a_2$ 1 as the selected wheel deceleration threshold $-\alpha_2$. On the other hand, the selector switch 8 is responsive to the LOW friction level indicative signal $\mu$ to select the second wheel acceleration indicative data $\alpha_b$ as the selected average wheel acceleration indicative data $\alpha$, and the second wheel deceleration threshold $-\alpha b_2$ as the selected wheel deceleration threshold $-\alpha_2$.

The integration circuit 10 is also connected to the wheel speed deriving circuit 4 to receive therefrom the wheel speed indicative analog data Vw. In embodiment shown, the integration circuit 10 is responsive to the HIGH level braking state indicative signal BS from the brake switch 1 to latch the instantaneous value of the wheel speed indicative data Vw and starts integration of the longitudinal acceleration indicative data Gx. The integration circuit 10 sums the integrated value of the longitudinal acceleration indicative signal values Gx and the latched wheel speed indicative signal value $V_w$ to derive a sum value which serves as vehicle body speed representative data $V_{ref}(Vs + \int |Gx| dt)$. The integration circuit 10 inputs the vehicle speed representative data $V_{ref}$ to the control unit 12.

The control unit 12 comprises a microprocessor including an input interface 12a, an arithmetic circuit 12c, a memory 12d and an output interface 12b. The control unit 12 has an analog-to-digital (A/D) converter in the input interface 12a for converting analog form inputs into digital data so that the microprocessor may process the input data for deriving anti-skid control signal. On the other hand, the output interface 12b may include a digital-to-analog (D/A) converter for converting the digital from anti-skid brake control signal into an analog form signal for operating the pressure control valve unit 16. As seen from FIG. 1, the anti-skid brake control signal comprises an induction control signal EV. In the embodiment shown the sample period of the first wheel acceleration deriving circuit 6A is set in 6 msec and the sample period of the second wheel acceleration deriving circuit 6B is set in an induction control signal EV (hereafter referred to as "EV signal"), a drain control signal AV (hereafter referred to as "AV signal") and a drain pump control signal MR (hereafter referred to as "MR signal").

The process of derivation of the wheel speed indicative analog data and the wheel acceleration indicative data has been disclosed in the following United States Patents, all owned by the common assignee to the present invention.

U.S. Pat. No. 4,408,290, issued on Oct. 4, 1983
U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on June 16, 1987
U.S. Pat. No. 4,680,714, issued on July 14, 1987
U.S. Pat. No. 4,682,295, issued on July 21, 1987
U.S. Pat. No. 4,680,713, issued on July 145, 1987
U.S. Pat. No. 4,669,046, issued on May 26, 1987
U.S. Pat. No. 4,669,045, issued on May 26, 1987
U.S. Pat. No. 4,679,146, issued on July 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986
U.S. Pat. No. 4,662,686, issued on May 5, 1987
U.S. Pat. No. 4,667,176, issued on May 19, 1987
U.S. Pat. No. 4,597,052, issued on June 24, 1986
U.S. Pat. No. 4,637,663, issued on Jan. 20, 1987
U.S. Pat. No. 4,683,537, issued on July 28, 1987

The disclosure of the above-identified United States Patents will be herein incorporated by reference for the sake of disclosure.

Figure 2:
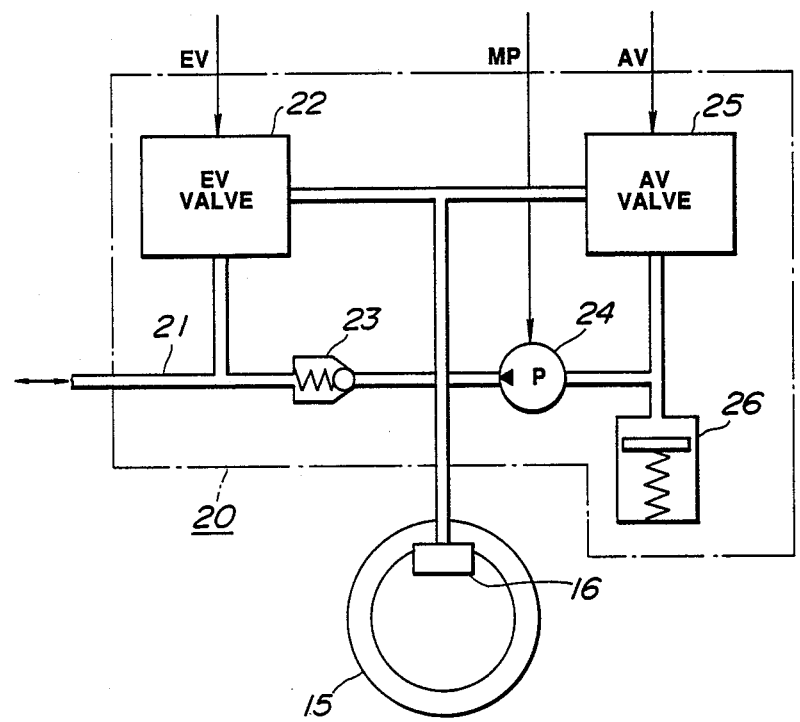
FIG. 2 is a diagram of the preferred construction of a pressure control valve unit employed in the first embodiment of an anti-skid brake control system of FIG. 1.

As shown in FIG. 2, the pressure control valve unit 16 comprises an induction control valve 22 which will be hereafter referred to as "EV valve", a drain control valve 25, which will be hereafter referred to as "AV valve", a drain pump 24 and a pressure accumulator 26. The pressure control valve 16 has an inlet port 21 connected to the master cylinder 8 to receive the working fluid pressure built up in the latter and an outlet port 27 connected the wheel cylinder 10. The EV valve 22 is interposed between the inlet port 43 and the outlet port 27 for controlling introduction of the pressurized working fluid to the wheel cylinder 10. The AV valve 25 is connected to the outlet of the EV valve 22, the outlet port 27 at the inlet side and to the pressure accumulator 26 and the drain pump 24. The discharge outlet drain pump 24 is connected to the inlet port 21 via a one-way check valve 23 for returning part of working fluid in the pressure control valve unit 1 to the fluid reservoir (not shown) and designed for supplying pressurized working fluid.

With the construction set forth above, the pressure control valve unit 16 essentially operates in three mutually different operational modes. Namely, the pressure control valve unit 16 operates in an APPLICATION mode for increasing braking pressure in the wheel cylinder 10, a RELEASE mode for decreasing braking pressure in the wheel cylinder, and a HOLD mode to maintain the braking pressure constant. In the APPLICATION mode position, the EV valve 22 is maintained in open position to establish fluid communication between the master cylinder 8 and the wheel cylinder 10 and the AV valve 25 is maintained closed position for blocking fluid communication between the wheel cylinder 10 and the pressure accumulator 26. At the same time, the drain pump 24 may be held inoperative state.

In the RELEASE mode position of the pressure control valve unit 16, the EV valve 22 is held closed to block fluid communication between the inlet port to the outlet port thereby blocking pressure supply from the master cylinder 8 to the wheel cylinder 10. At the same time, the AV valve 25 is maintained at open position to establish fluid communication between the outlet port 27, and the pressure accumulator 26 and the drain pump 24 so that the pressurized fluid in the wheel cylinder 10 can be drained to the pressure accumulator 26 or to the fluid reservoir via the drain pump 24 and the one-way check valve 23. In order to drain part of the working fluid from the wheel cylinder to the fluid reservoir, the drain pump 24 is driven in this RELEASE mode. On the other hand, in the HOLD mode position, both the EV valve 22 and the AV valve 25 are held closed for completely disconnecting the wheel cylinder 10 from the inlet port 21 and the pressure accumulator 26.

The EV valve 22 is held in the open position in response to the LOW level EV signal and shifted to close position in response to the HIGH level EV signal. On the other hand, the AV valve 25 is maintained at closed position as long as the AV signal is held LOW level and is opened by the HIGH level AV signal. The drain pump 24 is driven by the HIGH level MR signal.

The pressure control valve unit 16 is generally operated in the aforementioned three mode positions over skid control cycles. In general, skid control cycle is scheduled as follows:

(1) the pressure control valve unit 16 is maintained at the APPLICATION mode position upon initiation of the braking operation which is triggered by depression of the brake pedal 6, (2) by application of the braking force to the brake pedal, working fluid pressure is built up in the master cylinder 8, since the pressure control valve unit 16 is held at the APPLICATION mode position, the braking pressure in the wheel cylinder 10 is increased linearly in proportion to increasing of the working fluid pressure to decelerate the wheel speed;

(3) by increasing the braking pressure, wheel deceleration $-\alpha$ (negative value of wheel acceleration) increases and becomes greater than a predetermined deceleration threshold $-\alpha_2$, the control unit 12 is responsive to the wheel deceleration increased across the deceleration threshold to initiate skid control cycle, upon which the skid control cycle enters into HOLD mode cycle period to place the pressure control valve unit 16 at the HOLD mode position to maintain the increased level of braking pressure constant;

(4) by holding the increased level of braking pressure in the HOLD mode position of the pressure control valve unit 16, wheel is decelerated to increase wheel slippage across a predetermined wheel slippage threshold, the control unit 12 is responsive to increasing the wheel slippage across the wheel slippage threshold to terminal the HOLD mode cycle period and trigger the RELEASE mode cycle period, in which the pressure control valve unit 16 is placed in the RELEASE mode position to decrease braking pressure in the wheel cylinder 10;

(5) by maintaining the pressure control valve unit 16 in the RELEASE mode position, braking pressure is reduced and the wheel is accelerated to result in increasing wheel acceleration $+\alpha$ across a predetermined wheel acceleration threshold $+\alpha_1$, the control unit 12 is responsive to increasing wheel acceleration $+\alpha$ across the wheel acceleration threshold $+\alpha_1$ to terminate the RELEASE mode cycle period and trigger a HOLD mode cycle period to switch the position of the pressure control valve unit 16 from the RELEASE mode position to the HOLD mode position in order to hold the braking pressure at the lowered level;

(6) by maintaining the pressure control valve unit 16 at the HOLD mode, wheel speed is resumed and increased across the vehicle body speed and subsequently returns to the speed corresponding to the vehicle body speed, the control unit 12 is responsive to the wheel speed once increased across the vehicle body speed and subsequently returned to the vehicle body speed to terminate the HOLD mode cycle period and trigger the APPLICATION mode cycle period; skid cycles (3) to (6) are repeated while anti-skid control is active.

The following is a discussion of the practical process of anti-skid brake control operation performed by the preferred embodiment of the anti-skid brake control system set forth above.

The embodiment of the anti-skid brake control system shown is triggered in response to turning ON the ignition switch to initiate power supply. Then, wheel speed sensors 3 start monitoring rotation speed of respectively corresponding wheels 15. The wheel speed sensors 3 thus continuously produce the wheel speed indicative signals $v_w$. The alternating current form of wheel speed indicative signals $v_w$, is cyclically or periodically converted into digital wheel speed indicative data Vw by the A/D converter in the input interface to be processed in the control unit 12.

On the other hand, both of the first and second wheel acceleration deriving circuits 6A and 6B cyclically or periodically derive the first and second average wheel acceleration indicative data $\alpha_a$ and $\alpha_b$ over mutually different lengths of the wheel acceleration deriving period. The selector circuit 8 receives both of the first and second average wheel acceleration indicative data $\alpha_a$ and $\alpha_b$. The selector circuit 8 is responsive to the HIGH friction level indicative signal $\mu$ to select the first average wheel acceleration indicative data $\alpha_a$ as the average wheel acceleration indicative data $\alpha$, and the first wheel deceleration threshold $-\alpha a_2$ as the selected wheel deceleration threshold $-\alpha_2$. On the other hand, the selector switch 8 is responsive to the LOW friction level indicative signal $\mu$ to select the second wheel acceleration indicative data $\alpha_b$ as the selected average wheel acceleration indicative data $\alpha$, and the second wheel deceleration threshold $-\alpha b_2$ as the selected wheel deceleration threshold $-\alpha_2$.

The control unit 12 performs the anti-skid brake control operation on the basis of the wheel speed indicative data Vw input from the wheel speed deriving circuit 4, the vehicle speed representative data $V_{ref}$ input from the integration circuit 10, the selected average wheel acceleration indicative data $\alpha$ and the selected wheel deceleration threshold $-\alpha_2$.

Figure 3:
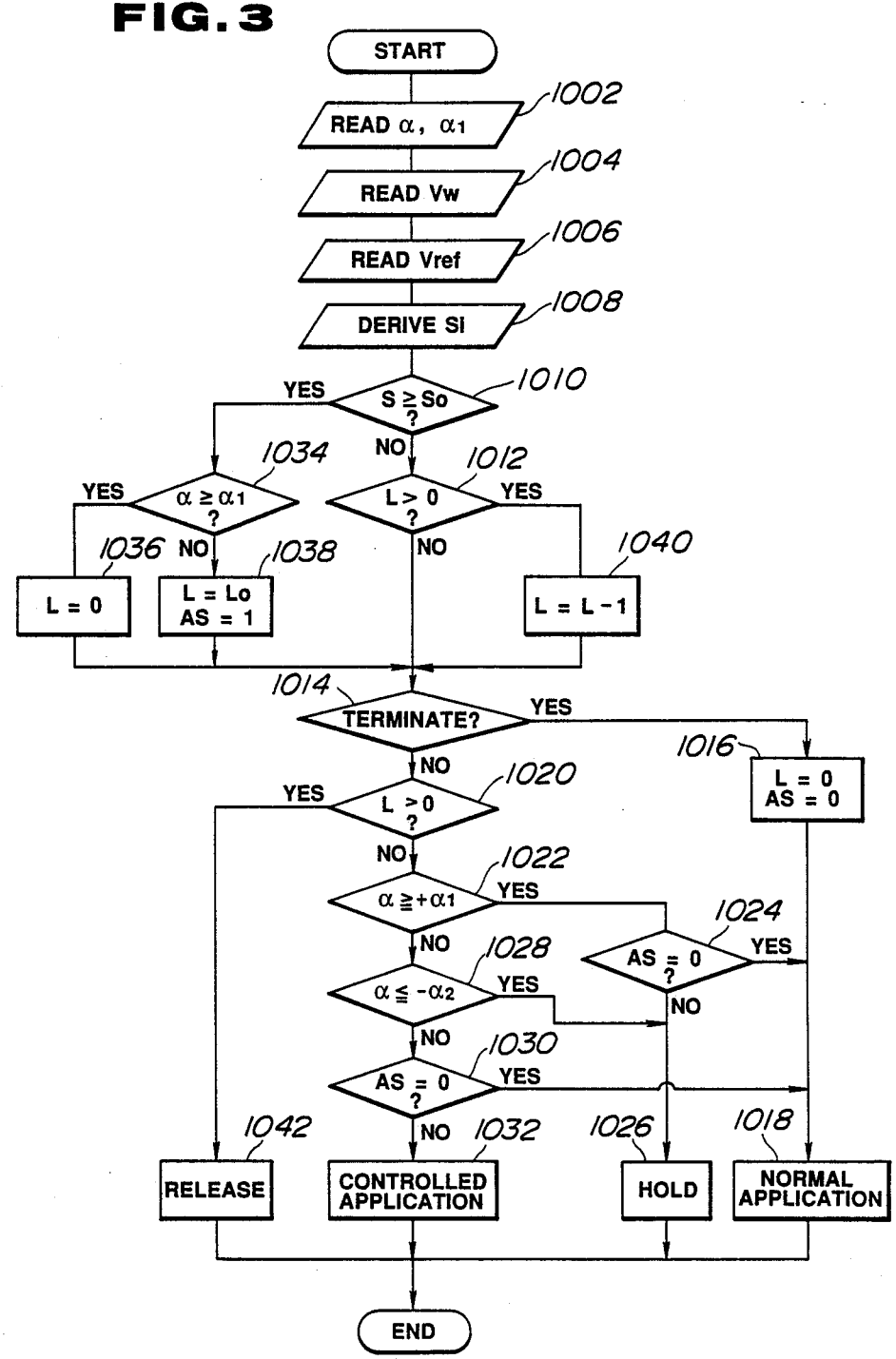
FIG. 3 is a flowchart of a skid cycle control routine to be executed by a control unit in the first embodiment of the anti-skid brake control system of FIG. 1.

FIG. 3 shows a skid cycle control routine for controlling the skid control cycle generally according to the schedule set forth in the general discussion of the process of anti-skid brake control.

Immediately after starting execution, the selected average wheel acceleration indicative data $\alpha$ and the selected wheel deceleration threshold $-\alpha_2$ are read out at a step 1002. At a step 1004, the wheel speed indicative data Vw is read out. At a step 1006, the vehicle body speed representative data $V_{ref}$ is read out. At a step 1008, the wheel slippage Si is derived according to the following equation:

$$Si = \{(V_{ref} - Vw)/V_{ref}\} \times 100 \ (\%).$$

The wheel slippage Si is compared with a predetermined wheel slippage threshold $S_0$ at a step 1010. The wheel slippage threshold $S_0$ may be set at about the optimum wheel slippage range where an optimum vehicle braking efficiency can be obtained. In the embodiment, shown, the wheel slippage threshold $S_0$ is set at 15%.

As seen from the timing chart in FIG. 5, the embodiment shown performs APPLICATION mode operation in two mutually different modes. As shown in the period $t_1$ and $t_2$, the braking pressure increases linearly according to increasing of the fluid pressure built up in the master cylinder 8. Such an operational mode will be hereafter referred to as "NORMAL APPLICATION mode". In other operational mode as illustrated in the period $t_6$ to $t_7$... in FIG. 5, the pressure control valve 16 is operated alternatively to the APPLICATION mode position and HOLD mode position for increasing the braking pressure in stepwise fashion. This operation mode will be hereafter referred to as "CONTROLLED APPLICATION mode". The CONTROLLED APPLICATION mode is introduced in order to lower the increasing speed of the braking pressure in the wheel cylinder so that the braking pressure is held at a level close to a pressure where the optimum wheel slippage is obtained and hereafter referred to as "lock pressure", for an expanded period.

At the initial stage of the braking operation, wheel slippage Si is held smaller than that wheel slippage threshold $S_0$. Therefore, the answer at the step 1010 at the initial braking state becomes negative. Then, at a step 1012, a check is performed whether a RELEASE mode timer value L of a RELEASE mode timer (not shown but facilitated in the arithmetic circuit 12c of the microprocessor 12) is greater than zero or not. At this time, the RELEASE mode timer value L is maintained at zero, the answer at the step 1012 also becomes negative. Then, at a step 1014, judgement is made that the condition satisfies a predetermined skid control terminating condition.

In the practical embodiment, the skid control terminating conditions are set as follows:
when the vehicle body speed indicative data $V_{ref}$ is smaller than or equal to a vehicle body stopping state indicative reference value $V_{ref0}$;
when the number of occurrences of switching of the pressure control valve mode position in the CONTROLLED APPLICATION mode becomes greater than or equal to a predetermined value $N_0$; and
when the brake switch is turned OFF.

When the skid control terminating condition is satisfied as checked at the step 1014, the RELEASE mode timer value L is cleared and a skid control state indicative period flag AS is reset at a step 1016. At a step 1018, the NORMAL APPLICATION mode skid control cycle period is commanded. Thereafter, process goes to END.

If the skid control terminating conditions as checked at the step 1014 is not satisfied, the RELEASE mode timer value L is again checked at a step 1020. When the RELEASE mode timer value L is smaller than or equal to zero as checked at the step 1020, the wheel acceleration $\alpha$ is compared with a predetermined acceleration threshold $+\alpha_1$ at a step 1022. If the acceleration as checked at the step 1022 is greater than or equal to the wheel acceleration threshold $+\alpha_1$, it means that the wheel is not yet decelerated after initiation of increasing of the braking pressure or the wheel is accelerated during the RELEASE mode cycle period. Therefore, in order to discriminate the instantaneous status of the braking condition, a check is performed whether the skid control state indicative flag AS is set at a step 1024. When the skid control state indicative flag AS is not as checked at a step 1024, then the process goes to step 1018 for setting the operation mode to the NORMAL APPLICATION mode.

On the other hand, when the skid control state indicative flag AS is set as checked at the step 1024, then a judgement is made that it is the time to switch the skid control cycle from the RELEASE mode cycle period to the HOLD mode cycle period because the wheel acceleration $\alpha$ is held greater than the wheel acceleration threshold $+\alpha_1$ and the operational mode is held in the RELEASE mode. Then, the HOLD mode cycle period is commanded at a step 1026. After commanding the HOLD mode cycle period, the process goes END.

On the other hand, when the wheel acceleration $\alpha$ as compared with the wheel acceleration threshold $+\alpha_1$ at the step 1022, is smaller than the acceleration threshold $+\alpha_1$, then the wheel acceleration $\alpha$ is checked with a predetermined wheel deceleration threshold $-\alpha_2$ at a step 1028. When the wheel acceleration $\alpha$ as checked at the step 1028 is smaller than the wheel deceleration threshold $-\alpha_2$, it means that the braking condition requires anti-skid control. Then, at the step 1026, the HOLD mode cycle period is commanded for placing the pressure control valve 16 at the HOLD mode position, at a step 1026.

If the wheel acceleration $\alpha$ as compared with the wheel deceleration threshold $-\alpha_2$ at the step 1028 is greater than the wheel deceleration threshold, the skid control state indicative flag AS is checked at a step 1030. If the skid control mode indicative flag AS is not set as checked at the step 1030, process goes to the step 1018. On the other hand, when the skid control state indicative flag AS is not set as checked at the step 1030, the CONTROLLED APPLICATION mode cycle period is commanded at a step 1032.

On the other hand, when wheel slippage Si as checked at the step 1010 is greater than or equal to the wheel slippage threshold $S_0$, then the wheel acceleration $\alpha$ is compared with the wheel acceleration threshold $+\alpha_1$ at a step 1034. When the wheel acceleration $\alpha$ as checked at the step 1030 is greater than or equal to the wheel acceleration threshold $+\alpha_1$, a judgement can be made that the condition is not satisfied to perform the RELEASE mode skid control cycle period operation. Therefore, the RELEASE mode timer value L is cleared at a step 1036. On the other hand, when the wheel acceleration $\alpha$ as checked at the step 1034 is smaller than the wheel acceleration threshold $+\alpha_1$, a judgment can be made that a condition for performing the RELEASE mode skid control mode cycle period is satisfied. Therefore, at a step 1038, the RELEASE mode timer value L is set at a predetermined initial timer value $L_0$ which represents a period to maintain the RELEASE mode skid control cycle period after the wheel slippage Si is decreased across the wheel slippage threshold $S_0$. At the same time, the skid control state indicative flag AS is set.

When the RELEASE mode timer value L as checked at the step 1012 is greater than zero (0), then, the RELEASE mode timer value L is decremented by one (1) at a step 1040 and thereafter the process moves to the step 1014. When the RELEASE mode timer value L as decremented at the step 1040 is still held greater than zero (0), the answer at the step 1020 becomes positive since the RELEASE mode timer value is greater than zero. Then, the process goes to a step 1042 to command the RELEASE mode skid control cycle period.

The example of practical operation of anti-skid control performed through the routine of FIG. 3 will be discussed hereblow with reference to FIGS. 4 and 5.

At the initial stage of braking operation starting at the time $t_1$, the braking pressure is gradually increased according to increasing of the fluid pressure in the master cylinder 18. According to the increase of the braking pressure, wheel acceleration $\alpha$ (negative value: $-\alpha$) decreases as illustrated between points a and b in FIG. 4. During this initial stage of the braking operation, The wheel slippage Si is smaller than the wheel slippage threshold $S_0$. Therefore, the answer in the step 1010 is held negative. At this time, since the anti-skid control is not yet initiated, the RELEASE mode timer value L is maintained at zero (0). Therefore, the answer at the step 1012 also becomes negative. Since the brake is applied, the answer in the step 1014 is negative to indicate that the condition for satisfying termination of the anti-skid control is not established.

Figure 4:
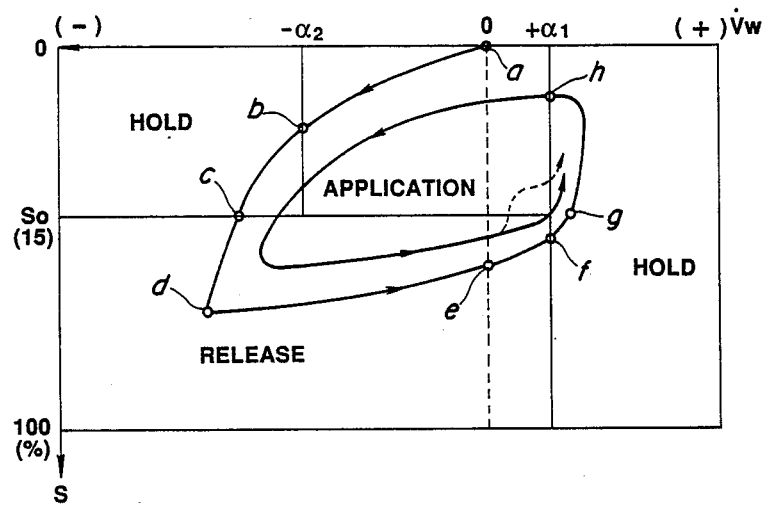
FIG. 4 is a chart showing the schedule of selection of an operation mode of the first embodiment of the anti-skid brake control system over a skid control cycle.

Until the wheel acceleration $\alpha$ is decreased to be smaller than the wheel deceleration threshold $-\alpha_2$ at the point b in FIG. 4, is detected at the step 1028, the NORMAL APPLICATION mode is repeatedly commanded at the step 1018 for increasing the braking pressure in linear fashion as illustrated in the period $t_1$ to $t_2$. Therefore, at the initial stage of braking operation, the NORMAL APPLICATION mode skid cycle is performed for a period between $t_1$ to $t_2$, as indicated in FIG. 5. At a time $t_2$, the wheel acceleration $\alpha$ ($-\alpha$) decreases across the wheel deceleration threshold $-\alpha_2$, therefore, the answer in the step 1028 turns into positive. As a result, the HOLD mode skid control cycle period is commanded at the step 1026 as illustrated between points b and c in FIG. 4. Therefore, the anti-skid control system becomes active for performing anti-skid brake control operation. The HOLD mode skid control cycle period is maintained with a period between $t_2$ and $t_3$ until the wheel slippage Si is increased across the wheel slippage threshold $S_0$ at a point c of FIG. 4.

When the wheel slippage Si becomes greater than or equal to the wheel slippage threshold $S_0$ at the time $t_3$, the answer in the step 1010 becomes positive. At the initial stage of the RELEASE mode skid control cycle period, the wheel acceleration $\alpha$ is maintained smaller than the wheel acceleration threshold $+\alpha_2$. Therefore, the answer in the step 1034 becomes negative. This causes setting of the RELEASE mode timer value L to the initial value $L_0$ and setting of the skid control state indicative flag AS, at the step 1038. By setting the RELEASE mode timer value L to $L_0$, the answer in the step 1020 becomes positive to command RELEASE mode skid control cycle period at the step 1042 as illustrated through points c, d, e and f of FIG. 4.

After starting decreasing of the braking pressure in the RELEASE mode, wheel speed still continues to be decelerated at a gradually decreasing rate. Immediately after starting reduction of the braking pressure, the braking pressure still is held high enough to cause deceleration of the wheel and thus the wheel acceleration $\alpha$ still continues to be decreased toward the point d. At the point d of FIG. 4, the rate of change of the wheel acceleration $\alpha$ in the decelerating direction becomes zero. Then, the wheel acceleration $\alpha$ is gradually increased and reaches zero (0) from point d of FIG. 4 to the point e. Also while the braking pressure is reduced in the RELEASE mode, the decreasing rate of the wheel speed becomes zero at a time $t_4$, and then wheel speed starts to be resumed toward the vehicle body speed to decrease wheel slippage Si across the wheel slippage threshold $S_0$. This results in negative answer in the step 1010. As long as the RELEASE mode timer value L is held greater than zero (0), the answer in the step 1012 is held positive and is decreased by one (1) every occurrence of execution of the routine of FIG. 3. As long as the RELEASE mode timer value L is maintained greater than zero (0), the RELEASE mode skid control cycle period is repeatedly commanded for maintaining the pressure control valve 16 at the RELEASE mode position, as illustrated by the period between $t_3$ and $t_5$ in FIG. 5.

When the RELEASE mode timer value L is decreased to zero at the step 1040 or, in the alternative, when the wheel acceleration $\alpha$ becomes greater than or equal to the wheel acceleration threshold $+\alpha_1$ to turn the answer in the step 1034 into positive to cause clearing the RELEASE mode timer value L to zero at the step 1012, the answer in the step 1020 becomes negative. At this time, since the wheel acceleration $\alpha$ is greater than or equal to the wheel acceleration threshold $+\alpha_1$ and the skid control state indicative flag AS is set, the HOLD mode skid control cycle period is commanded at the step 1026 as illustrated through points f, g and h of FIG. 4.

During the HOLD mode skid control cycle period, wheel speed $Vw_n$ continues to increase resulting in the wheel speed indicative data becoming greater than or equal to the vehicle body speed representative $V_{ref}$ at a time $t_5$.

By maintaining the skid control cycle at the HOLD mode skid control cycle period as set forth, the wheel acceleration $\alpha$ is decreased across the wheel acceleration threshold $+\alpha_1$. Then, the CONTROLLED APPLICATION mode skid control cycle period is commanded at the step 1032 since the skid control state indicative flag AS is held in set position.

In the CONTROLLED APPLICATION mode skid control cycle, the braking pressure in the wheel cylinder is gradually increased to decrease the wheel acceleration α across the wheel deceleration threshold $-α_2$ at a time $t_7$. Then, the HOLD mode skid control cycle period starts to maintain the braking pressure control unit a time $t_8$ at which the wheel slippage Si increases across the wheel slippage threshold $S_0$. Subsequent skid cycle operations will be performed over one or more skid cycles until the skid control terminating condition set forth above is satisfied.

During the anti-skid brake control operation, the road surface friction is cyclically or continuously monitored for selecting the first and second wheel acceleration indicative data $α_a$ and $α_b$ and the first and second wheel deceleration threshold $-αa_2$ and $-αb_2$. Therefore, even when the road surface friction level is changed during braking operation, the shown embodiment of the anti-skid control system can respond to changing of the friction on the surface condition to adapt the response characteristics to the road surface condition.

Figure 6:
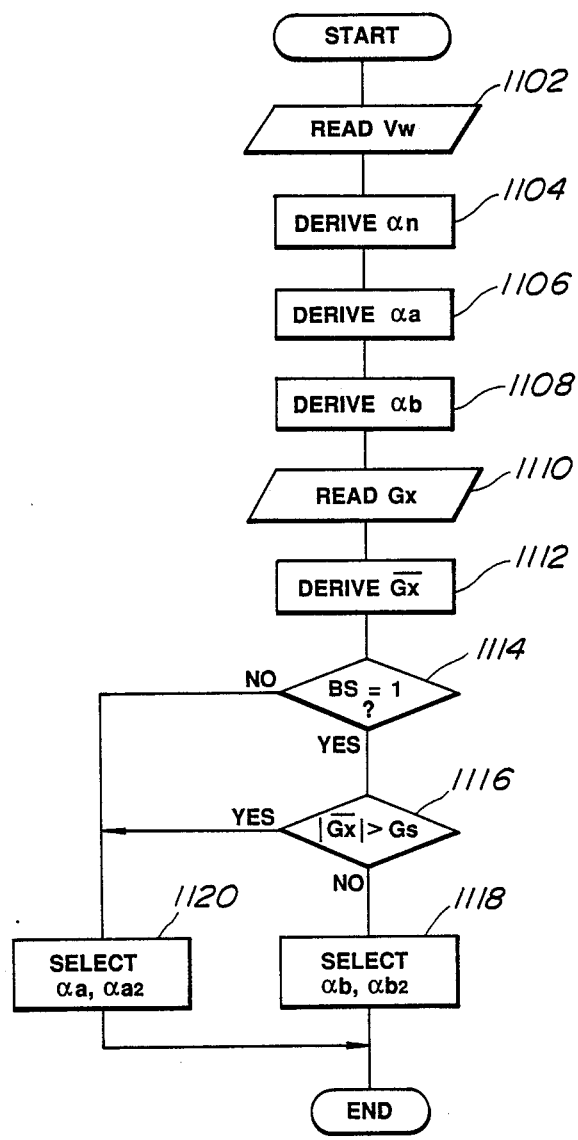
FIG. 6 is a flowchart of a routine for selecting one of the arithmetic operation modes in a modified process of anti-skid brake control.

Though the foregoing first embodiment employs the selector circuit 8 and the friction detector 7 as hardware for selecting the wheel acceleration indicative data and the wheel deceleration threshold, it is not essential to implement the present invention. Selection of the wheel acceleration and the wheel deceleration can be done through software process to be performed by the control unit 12. FIG. 6 shows one example of the routine to be executed by the control unit 12 for selecting the wheel acceleration indicative data and wheel deceleration threshold.

The process shown in FIG. 6 is executed with a given interval, e.g. 5 msec. Immediately after starting execution, the instantaneous wheel speed indicative data Vw is read out at a step 1102. A difference of the instantaneous wheel speed indicative data Vw as read out at the step 1102 and the wheel speed indicative data read in the immediately preceding execution cycle is derived at a step 1104. By dividing the difference of the wheel speed indicative data, an instantaneous wheel acceleration indicative data $α_n$ is derived at a step 1104.

At a step 1106, a running average $α_a$ of the wheel acceleration indicative data over a first given number of wheel acceleration indicative data $α_n$ over a first predetermined number of succeeding execution cycles. In the shown embodiment, the running average $α_a$ of the wheel acceleration indicative data is derived over six execution cycles including the current execution cycle. Similarly, at a step 1108, a running average $α_b$ of the wheel acceleration indicative data over a first given number of wheel acceleration indicative data $α_n$ over a first predetermined number of succeeding execution cycles. In the shown embodiment, the running average $α_b$ of the wheel acceleration indicative data is derived over twelve execution cycles including the current execution cycle.

At a step 1110, the longitudinal acceleration indicative data Gx is read out. A running average $\overline{Gx}$ is derived on the basis of the longitudinal acceleration indicative data Gx read in the step 1110, at a step 1112. Then, a check is performed whether the braking state indicative signal BS input from the brake switch 1 is HIGH or not, at a step 1114. If the braking state indicative signal BS is a HIGH level as checked as 1114, the absolute value of running average $|\overline{Gx}|$ is compared with the friction level threshold Gs at a step 1116.

When the absolute value of the running average $|\overline{Gx}|$ is smaller than or equal to the friction level threshold Gs, then the running average $α_b$ of the wheel acceleration indicative data $α_n$ is selected at a step 1118. In the step 1118, the second wheel deceleration threshold $-αb_2$ is also selected. On the other hand, when the braking state indicative signal BS is not a HIGH level as checked at the step 1114 or when the absolute value of the running average of the longitudinal acceleration indicative data $\overline{Gx}$ is greater than the friction level threshold Gs as checked at the step 1116, the first wheel acceleration indicative data $α_a$ is selected. Also, simultaneously, the first wheel deceleration threshold $-αa_2$ defines a higher maximum deceleration level than that of the second wheel deceleration threshold.

As will be appreciated herefrom, substantially same selection of the wheel acceleration indicative data and the wheel deceleration threshold can be done through the process illustrated in FIG. 6.

Figure 7:
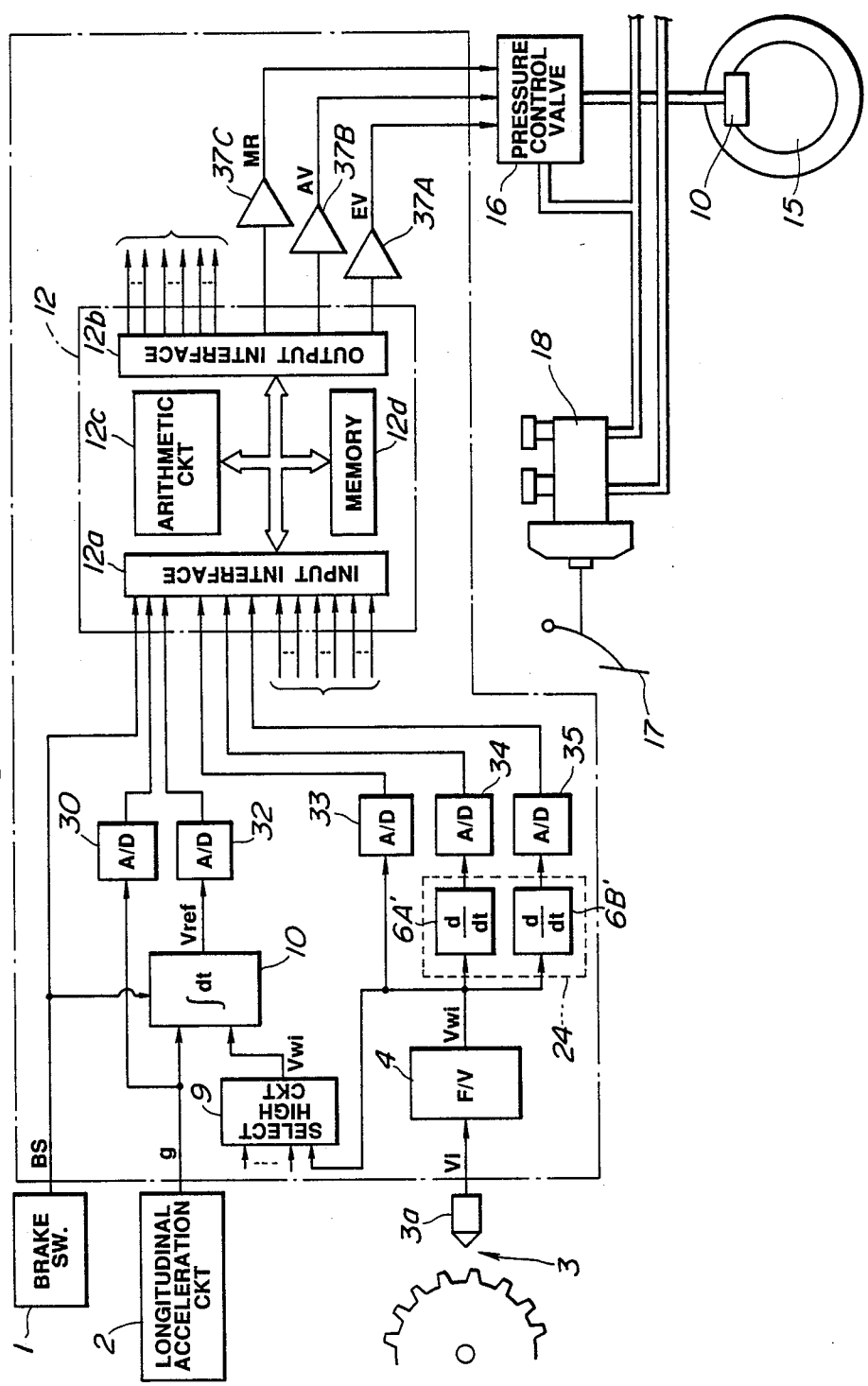
FIG. 7 is a schematic block diagram of the second embodiment of an anti-skid brake control system according to the present invention.

FIG. 7 shows the second embodiment of the anti-skid brake control system according to the present invention. In the discussion for the second embodiment of the anti-skid brake control system according to the invention, the common components to that of the foregoing embodiment set forth above, may be represented by the same reference numerals and will be neglected the detailed discussion so as to simplify the disclosure.

In the shown embodiment, the F/V converters 4 connected to pick-ups $3a$ of the wheel speed sensors 3 for monitoring rotation speed of respective of the front-left, front-right, rear-left and rear-right wheels are commonly connected to a select-HIGH circuit 9 which is designed for selecting one of the wheel indicative data Vw having the greatest value among four inputs and outputs the selected one of the wheel speed indicative data as the maximum wheel speed indicative data $Vw_{max}$. The integration circuit 10 derives the vehicle body speed representative data $V_{ref}$ on the basis of the integrated value of the longitudinal acceleration indicative data Gx and the maximum wheel speed indicative data $Vw_{max}$.

In the embodiment shown the longitudinal acceleration sensor 2 is connected to the control unit 12 via an A/D converter 30 for inputting the digital form longitudinal acceleration indicative data Gx. Also, the integration circuit 10 inputs the vehicle body speed representative data $V_{ref}$ in a digital form as converted into the digital form, to the control circuit 12.

The F/V converter 4 serving as the wheel speed deriving circuit is connected to first and second wheel acceleration deriving circuits 6A' and 6B'. These first and second acceleration deriving circuits 6A' and 6B' comprise a differentiation circuit for differentiating the wheel speed indicative data Vw over a mutually different differentiation periods. In the practical embodiment, the first wheel acceleration deriving circuit 6A' is provided with a shorter differentiation period than that in the second wheel acceleration deriving circuit 6B'. Though the embodiment shows utilize the differentiation circuits for forming the wheel acceleration deriving circuits, it is of course possible to formulate these wheel acceleration deriving circuits by the circuits the same as or similar to the foregoing first embodiment.

The first and second wheel acceleration deriving circuits 6A' and 6B' and the F/V converters 4 are connected to the control circuit 12 via A/D converters 33, 34 and 35.

On the other hand, the output interface $12b$ is connected to amplifiers 37A, 37B and 37C to amplify the EV signal, AV signal and MR signal to the pressure control valve unit 16 for controlling the valve position.

Figure 8:
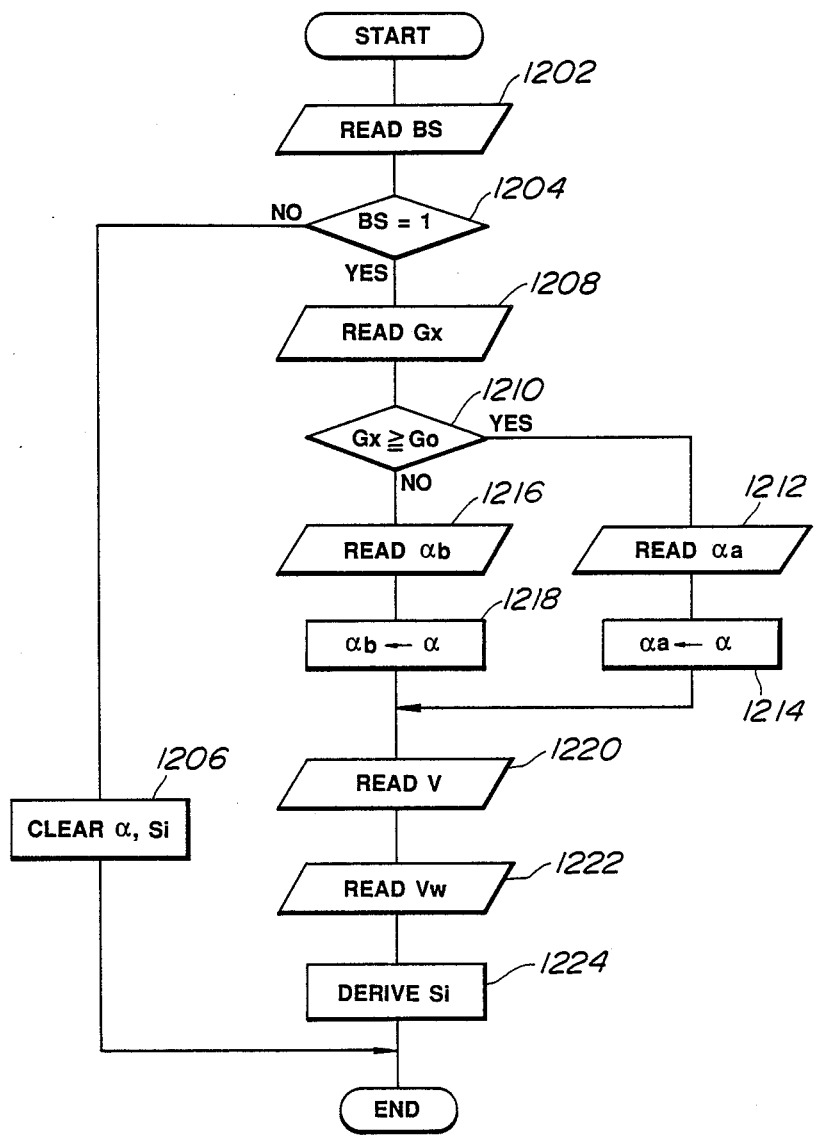
FIG. 8 is a flowchart of a routine for deriving wheel slippage to be used in anti-skid brake control.

The control unit 12 performs anti-skid brake control operation through the process discussed herebelow with reference to FIGS. 8 to 11. FIG. 8 shows a routine for deriving the wheel slippage Si. Immediately after starting execution, the braking state indicative signal level BS is read out at a step 1202. Then, the read braking state indicative signal level BS is checked whether it is a HIGH level or not, at a step 1204. When the braking state indicative signal level BS is a LOW level as checked at the step 1204, the wheel acceleration indicative data $\alpha$ and the wheel slippage Si are cleared at a step 1206.

On the other hand, when the read braking state indicative signal level BS is a HIGH level as checked at the step 1204, the longitudinal acceleration indicative data Gx is read out at a step 1208. The longitudinal acceleration indicative data Gx is compared with a longitudinal acceleration threshold $G_0$, at a step 1210. If the longitudinal acceleration indicative data Gx is greater than or equal to the longitudinal acceleration threshold $G_0$, the first wheel acceleration indicative data $\alpha_a$ derived by the first wheel acceleration deriving circuit 6A' is selected to read out, at a step 1212. Then, the first wheel acceleration indicative data $\alpha_a$ is set as the wheel acceleration indicative data $\alpha$ at a step 1214. On the other hand, when the longitudinal acceleration indicative data Gx is smaller than the longitudinal acceleration threshold $G_0$ as checked at the step 1210, the second wheel acceleration indicative data $\alpha_b$ derived by the second wheel acceleration deriving circuit 6B' is selected to be read out, at a step 1216. Then, at a step 1218, the second wheel acceleration indicative data $\alpha_b$ is set as the wheel acceleration data indicative $\alpha$.

At a step 1220, the vehicle body speed representative data $V_{ref}$ is read out, and subsequently at a step 1222, the maximum wheel speed indicative data $Vw_{max}$ are read out. Thereafter, the wheel slippage Si is derived on the basis of the vehicle speed representative data $V_{ref}$ and the maximum wheel speed indicative data $Vw_{max}$, at a step 1224. Thereafter, the process goes to END.

Figure 9:
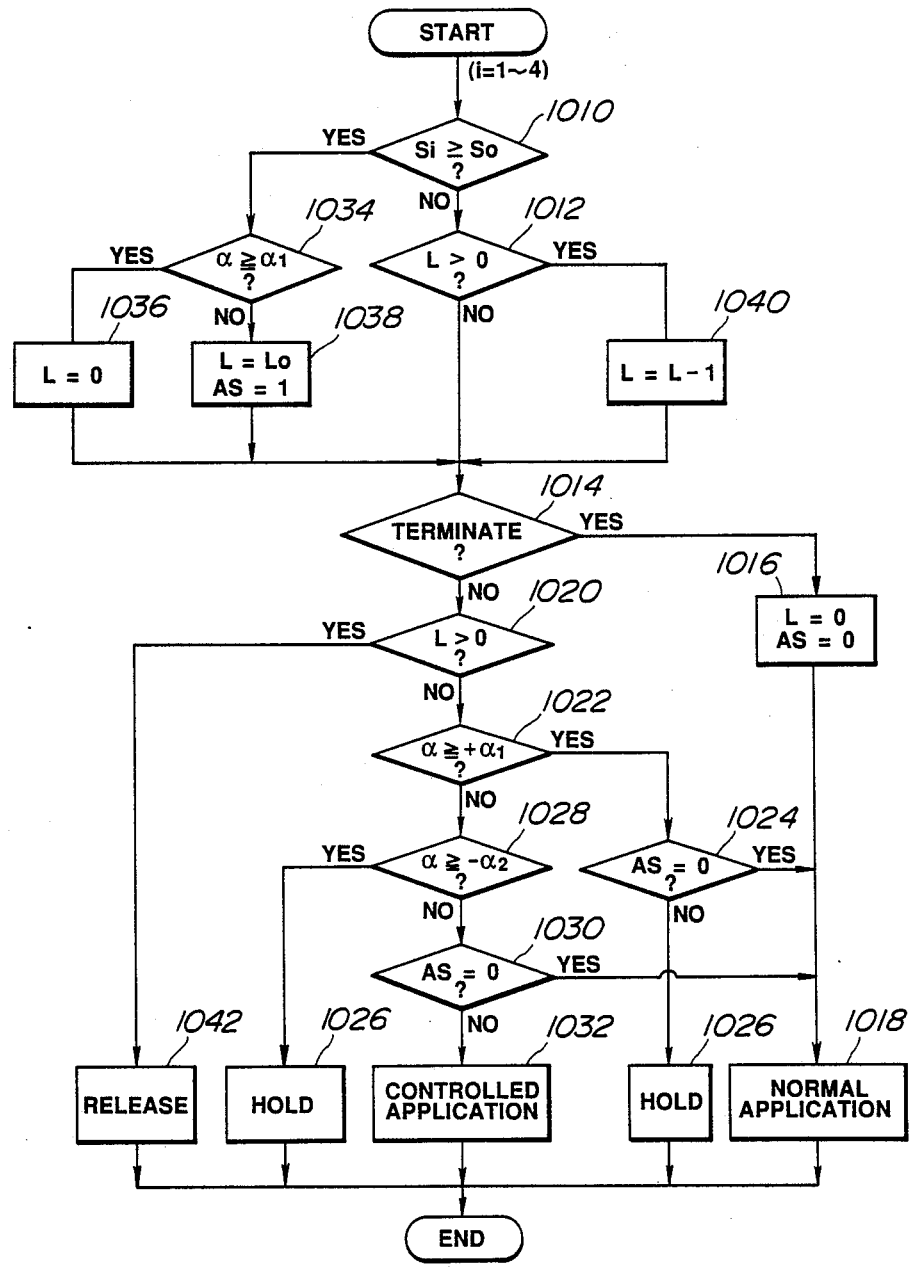
FIG. 9 is a flowchart of a skid cycle control routine to be executed by a control unit in the second embodiment of the anti-skid brake control system of FIG. 7.

Based on the wheel speed indicative data Vw representative of the wheel speed of respective wheels, the vehicle body speed data $V_{ref}$, the wheel acceleration indicative data $\alpha$ derived with respect to respective wheels based on respectively associated wheel speed indicative data, anti-skid brake control is performed through the process as shown in FIG. 9. As seen from FIG. 9, the process of controlling skid control cycle is substantially the same as that of the foregoing first embodiment. Therefore, respective process steps of the routine of FIG. 9 will be represented by the same reference numerals in FIG. 3. Namely, in the shown process, the steps of the routine correspond to the steps between 1010 to 1042.

Figure 10:
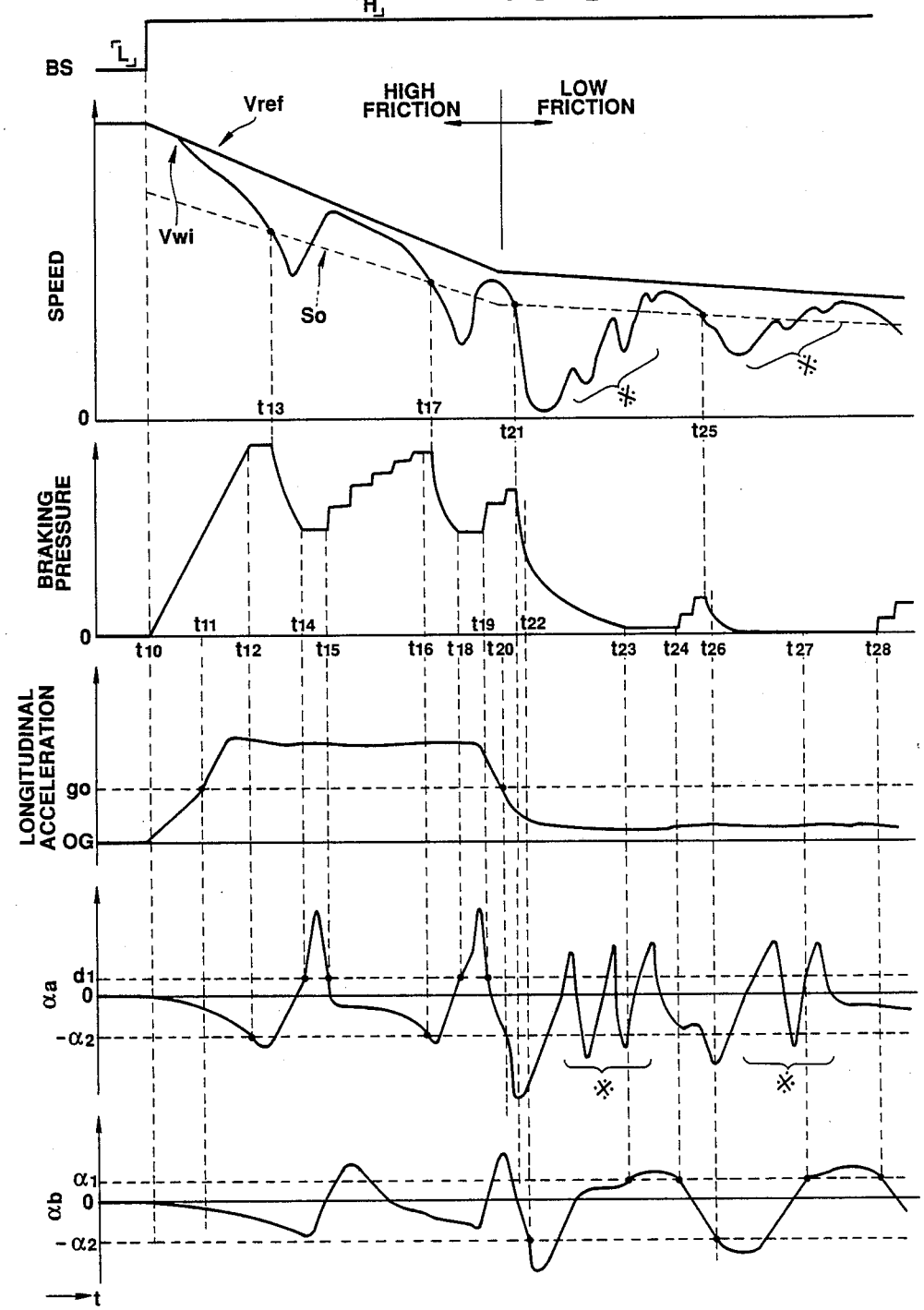
FIG. 10 is a timing chart showing an example of an anti-skid brake control operation performed by the second embodiment of the anti-skid brake control system of FIG. 7.
Figure 11:
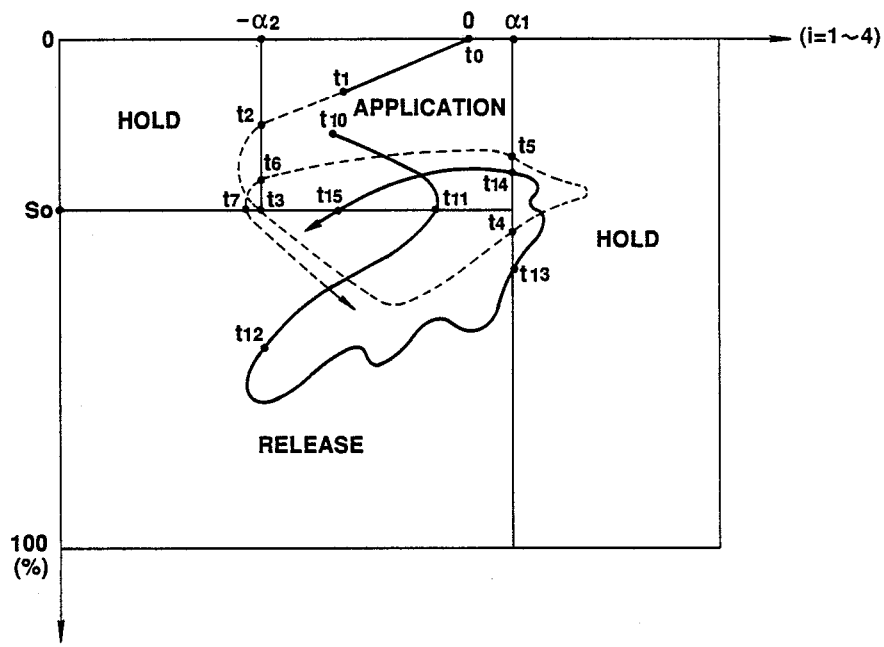
FIG. 11 is a chart showing the schedule of selection of an operation mode of the second embodiment of the anti-skid brake control system over a skid control cycle.

The practical operation of skid control will be discussed in terms of an example of actual braking operation as illustrated in FIGS. 10 and 11.

At the initial stage of braking operation starting at the time $t_{10}$, the braking pressure is gradually increased according to increasing of the fluid pressure in the master cylinder 18 in the NORMAL APPLICATION mode skid control cycle. At the initial stage, since the longitudinal acceleration indicative data Gx is maintained smaller than the longitudinal acceleration threshold $G_0$, the second wheel acceleration indicative data $\alpha_b$ is selected as the wheel acceleration indicative data $\alpha$ and the second wheel deceleration threshold $-\alpha b_2$ is selected as the wheel deceleration $-\alpha_2$. During this NORMAL APPLICATION mode skid control cycle period, the longitudinal acceleration indicative data Gx increases across the longitudinal acceleration threshold $G_0$ at a time $t_{11}$. Then, the first wheel acceleration indicative data $\alpha_a$ is selected as the wheel acceleration indicative data $\alpha$ and the first wheel deceleration threshold $-\alpha a_2$ is selected at the time $t_{11}$. According to increasing of the braking pressure, wheel acceleration $\alpha$ (negative value: $-\alpha$) decreases. During this initial stage of the braking operation, the wheel slippage Si is held smaller than the wheel slippage threshold $S_0$. Therefore, the answer in the step 1010 is held negative. At this time, since the anti-skid control is not yet initiated, the RELEASE mode timer value L is maintained at zero (0). Therefore, the answer at the step 1012 also becomes negative. Since the brake is applied, the answer in the step 1014 is negative to indicate that the condition for satisfying termination of the anti-skid control is not established.

Until the wheel acceleration $\alpha$ decreased to be smaller than the wheel deceleration threshold $-\alpha_2$ at a time $t_{12}$ is detected at the step 1028, the NORMAL APPLICATION mode is repeatedly commanded at the step 1018 for increasing the braking pressure in linear fashion as illustrated in the period $t_{10}$ to $t_{12}$. Therefore, at the initial stage of braking operation, the NORMAL APPLICATION mode skid cycle is performed for a period between $t_{10}$ to $t_{12}$, as indicated in FIG. 10, At a time $t_{12}$, the wheel acceleration $\alpha$ ($-\alpha$) decrease across the wheel deceleration threshold $-\alpha_2$, therefore, the answer in the step 1028 turns into positive. As a result, the HOLD mode skid control cycle period is commanded at the step 1026. Therefore, the anti-skid control system becomes active for performing anti-skid brake control operation. The HOLD mode skid control cycle period is maintained with a period between $t_{12}$ and $t_{13}$ until the wheel slippage Si is increased across the wheel slippage threshold $S_0$ at the time $t_{13}$.

When the wheel slippage Si becomes greater than or equal to the wheel slippage threshold $S_0$ at the time $t_{13}$, the answer in the step 1010 becomes positive. At the initial stage of the RELEASE mode skid control cycle period, the wheel acceleration $\alpha$ is maintained smaller than the wheel acceleration threshold $+\alpha_2$. Therefore, the answer in the step 1034 becomes negative. This causes setting of the RELEASE mode timer value L to the initial value $L_0$ and setting of the skid control state indicative flag AS, at the step 1038. By setting the RELEASE mode timer value L to $L_0$, the answer in the step 1020 becomes positive to command RELEASE mode skid control cycle period at the step 1042.

After starting decreasing of the braking pressure in the RELEASE mode, wheel speed still continue to be decelerated at a gradually decreasing rate. The rate of changing of the wheel acceleration $\alpha$ in the decelerating direction becomes zero. Then, the wheel acceleration $\alpha$ is gradually increased and reaches zero (0). Though the RELEASE mode, the decreasing rate of the wheel speed becomes zero and subsequently increase toward the vehicle body speed to decrease wheel slippage Si across the wheel slippage threshold $S_0$. This results in negative answer in the step 1010. As long as the RELEASE mode timer value L is held greater than zero (0), the answer in the step 1012 is held positive and is decreased by one (1) every occurrence of execution of the routine of FIG. 3. As long as the RELEASE mode timer value L is maintained greater than zero (0), the RELEASE mode skid control cycle period is repeatedly commanded for maintaining the pressure control valve 16 at the RELEASE mode position, as illustrated by the period between $t_{13}$ and $t_{14}$.

When the RELEASE mode timer value L is decreased to zero at the step 1040 or, in the alternative, when the wheel acceleration α becomes greater than or equal to the wheel acceleration threshold $+\alpha_1$ to turn the answer in the step 1034 into positive to cause clearing the RELEASE mode timer value L to zero at the step 1012, the answer in the step 1020 becomes negative. At this time, since the wheel acceleration α is greater than or equal to the wheel acceleration threshold $+\alpha_1$ and the skid control state indicative flag AS is set, the HOLD mode skid control cycle period is commanded at the step 1026, at the time $t_{14}$.

During the HOLD mode skid control cycle period starting at the time $t_{14}$, the wheel acceleration indicative data α once increased decreases across the wheel acceleration threshold $\alpha_1$, at a time $t_{15}$. Then, the CONTROLLED APPLICATION mode skid control cycle period is commanded at the step 1032 since the skid control state indicative flag AS is held in set position.

In the CONTROLLED APPLICATION mode skid control cycle, the braking pressure in the wheel cylinder is gradually increased to decrease the wheel acceleration α across the wheel deceleration threshold $-\alpha_2$ at a time $t_{16}$. Then, HOLD mode skid control cycle period starts to maintain the braking pressure control unit α time $t_{17}$ at which the wheel slippage Si increases across the wheel slippage threshold $S_0$. Subsequent skid cycle operations will be performed over one or more skid cycles until the skid control terminating condition set forth above is satisfied through the times $t_{18}$ to $t_{28}$.

During the skid control cycles, the longitudinal acceleration indicative data Gx decreases across the longitudinal acceleration threshold $G_0$, then, the second wheel acceleration indicative data $\alpha_b$ is selected as the wheel acceleration indicative data α and the second wheel acceleration threshold $-\alpha b_2$ is selected as the wheel deceleration threshold $-_2$.

When the wheel speed fluctuates during the foregoing skid control operation as illustrated in the region marked with the asterisk or stars (*) due to presence of noise or unevenness of the road surface, the first wheel acceleration indicative data $\alpha_1$ which is provided higher sensitivity may fluctuate according to fluctuation of the wheel speed Vw. At the same time no fluctuation can be observed in the second wheel acceleration indicative data $\alpha_b$ because of lower sensitivity. Since after the time $t_{20}$, the second wheel acceleration indicative data $\alpha_b$ and the second wheel deceleration threshold $-\alpha_2$ are selected, no influence of the fluctuation of the wheel speed will be caused for controlling the skid control cycle in the anti-skid control.

Therefore, according to the embodiment, shows, influence of noise to be superimposed on the wheel speed indicative signal can be successfully avoided.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An anti-skid brake control system for an automotive vehicle comprising:
a fluid circuit including a fluid pressure source and a wheel cylinder for generating a braking force for decelerating a wheel;
a pressure control valve means disposed in said fluid circuit for controlling braking pressure to be generated in said wheel cylinder, said pressure control valve means operating to increase said braking pressure in said wheel cylinder in a first mode position and to decrease said braking pressure in said wheel cylinder in a second mode position;
a first sensor means for monitoring a rotation speed of said wheel for producing a wheel speed indicative signal;
a second sensor means for monitoring a road friction indicative parameter for producing a friction indicative signal;
first arithmetic means for deriving first wheel acceleration indicative data, said first arithmetic means being provided a first higher sensitivity with respect to variation of said wheel speed indicative signal value;
second arithmetic means for deriving second wheel acceleration indicative data, said first arithmetic means being provided a second lower sensitivity with respect to variation of said wheel speed indicative signal value;
third arithmetic means detecting the friction condition on the road surface to select one of said first and second wheel acceleration indicative data for outputting selected wheel acceleration indicative data; and
fourth arithmetic means, receiving said wheel speed indicative signal and said selected wheel acceleration indicative data, for processing the input data for selecting one of a first mode in which said pressure control valve means is operated in said first mode position and a second mode in which said pressure control valve means is operated in said second mode position.

2. An anti-skid brake control system as set forth in claim 1, wherein said second sensor means produces said friction indicative signal which has a value varying between a high level representing a high friction condition and a low level representing a low friction condition, and said third arithmetic means selecting said first wheel acceleration indicative data in response to a high level friction indicative signal and selecting said second wheel acceleration indicative data in response to a low level friction indicative signal.

3. An anti-skid brake control system as set forth in claim 2, wherein said second sensor means comprises a longitudinal acceleration sensor for monitoring longitudinal acceleration exerted on a vehicle body to produce a longitudinal acceleration indicative signal.

4. An anti-skid brake control system as set forth in claim 3, wherein said second sensor means compares said longitudinal acceleration indicative signal with a predetermined longitudinal acceleration threshold to produce said high level friction indicative signal when said longitudinal acceleration indicative signal is greater than or equal to said longitudinal acceleration threshold and to produce said low level friction indicative signal otherwise.

5. An anti-skid brake control system as set forth in claim 3, wherein said second sensor means includes an averaging means receiving said longitudinal acceleration indicative signal to derive a running average of said longitudinal acceleration indicative signal values and comparing said running average with a predetermined threshold for producing said high level friction indicative signal when said running average is greater than or equal to said predetermined threshold and for producing said low level friction indicative signal when said running average is smaller than said predetermined threshold.

6. An anti-skid brake control system for an automotive vehicle comprising:
a fluid circuit including a fluid pressure source and a wheel cylinder for generating a braking force for decelerating a wheel;
a pressure control valve means disposed in said fluid circuit for controlling braking pressure to be generated in said wheel cylinder, said pressure control valve means operating to increase said braking pressure in said wheel cylinder in a first mode position, to decrease said braking pressure in said wheel cylinder in a second mode position, and to hold said braking pressure in said wheel cylinder constant in a third mode position;
a first sensor means for monitoring a rotation speed of said wheel for producing a wheel speed indicative signal;
a second sensor means for monitoring a road friction indicative parameter for producing a friction indicative signal;
first arithmetic means for deriving first wheel acceleration indicative data, said first arithmetic means being provided a first higher sensitivity with respect to variation of said wheel speed indicative signal value;
second arithmetic means for deriving first wheel acceleration indicative data, said first arithmetic means being provided a second lower sensitivity with respect to variation of said wheel speed indicative signal value;
third arithmetic means detecting the friction condition on the road surface to select one of said first and second wheel acceleration indicative data for outputting selected wheel acceleration indicative data; and
fourth arithmetic means, receiving said wheel speed indicative data, said selected wheel acceleration indicative data and vehicle body speed representative data for processing the input data for selecting one of a first mode in which said pressure control valve means is operated in said first mode position, a second mode in which said pressure control valve means is operated in said second mode position and a third mode in which said pressure control valve is operated in said third mode position.

7. An anti-skid brake control system as set forth in claim 6, wherein said fourth arithmetic means derives an anti-skid control signal for said pressure control valve means for operating the latter in one of said first, second and third modes to order said third mode in response to a selected wheel acceleration smaller than or equal to a predetermined deceleration threshold, to order said second mode in response to wheel slippage greater than or equal to a predetermined wheel slippage threshold, to order said third mode when wheel acceleration is greater than or equal to a predetermined acceleration threshold, and to order said first mode when wheel slippage is smaller than said wheel slippage threshold and said wheel acceleration is smaller than said wheel acceleration threshold and greater than said predetermined deceleration threshold.

8. An anti-skid brake control system as set forth in claim 6, wherein said fourth arithmetic means derives an anti-skid control signal by selecting one of each of said first, second and third modes for operating said pressure control valve to a corresponding one of said first, second and third positions according to the following sequence, said second arithmetic means deriving said anti-skid brake control signal to order said third mode in response to decreasing of wheel acceleration across a predetermined deceleration threshold, to order said second mode in response to increasing of wheel slippage across a predetermined wheel slippage threshold, to order said third mode in response to increasing of said wheel acceleration across a predetermined acceleration threshold, and to order said first mode in response to decreasing of said wheel slippage across said vehicle body speed representative data.

9. An anti-skid brake control system as set forth in claim 8, wherein said second sensor means produces said friction indicative signal which has a value varying between a high level representing a high friction condition and a low level representing a low friction condition, and said third arithmetic means selecting said first wheel acceleration indicative data in response to a high level friction indicating signal and selecting said second wheel acceleration indicative data in response to a low friction indicating signal.

10. An anti-skid brake control system as set forth in claim 9, wherein said second sensor means comprises a longitudinal acceleration sensor for monitoring longitudinal acceleration exerted on the vehicle body to produce a longitudinal acceleration indicative signal.

11. An anti-skid brake control system as set forth in claim 10, wherein said fourth arithmetic means includes means for integrating said longitudinal acceleration for generating integrated value data and means for latching said wheel speed indicative data at an initial stage of a respective skid control cycle, and means for deriving said vehicle speed representative data on the basis of said latched wheel speed indicative data and said integrated value data.

12. An anti-skid brake control system at set forth in claim 11, wherein said second sensor means compares said longitudinal acceleration indicative signal with a predetermined longitudinal acceleration threshold to produce said high level friction indicative signal when said longitudinal acceleration indicative signal is greater than or equal to said longitudinal acceleration threshold and to produce said low level friction indicative signal otherwise.

13. An anti-skid brake control system as set forth in claim 11, wherein said second sensor means includes averaging means receiving said longitudinal acceleration indicative signal to derive a running average of said longitudinal acceleration indicative signal values and comparing said running average with a predetermined threshold for producing said high level friction indicative signal when said running average is greater than of equal to said predetermined threshold and for producing said low level friction indicative signal when said running average is smaller than said predetermined threshold.

14. An anti-skid brake control system for an automotive vehicle comprising:

a fluid circuit including a fluid pressure source and a wheel cylinder for generating a braking force for decelerating a wheel;

at least first, second and third pressure control valve means disposed in said fluid circuit for controlling braking pressures generated in a respectively associated one of first, second and third wheel cylinders, each of said first, second and third pressure control valve means operating to increase said braking pressure in the associated one of said first, second and third wheel cylinders in a first mode, to decrease said braking pressure in said wheel cylinder in a second mode and to hold said braking pressure in said wheel cylinder at a constant value in a third mode;

first sensor means for monitoring rotation speed of a first vehicular wheel with which said first wheel cylinder is associated to produce a first wheel speed indicative signal;

second sensor means for monitoring rotation speed of a second vehicular wheel with which said second wheel cylinder is associated to produce a second wheel speed indicative signal;

third sensor means for monitoring rotation speed of a third vehicular wheel with which said third wheel cylinder is associated to produce a third wheel speed indicative signal;

fourth sensor means for monitoring a longitudinal acceleration exerted on a vehicle body for producing a longitudinal acceleration indicative signal;

first arithmetic means for deriving first wheel acceleration indicative data with respect to a respective one of said first, second and third wheels on the basis of a respectively corresponding one of said first, second and third wheel speed indicative signals said first arithmetic means being provided a first higher sensitivity with respect to variation of a wheel speed indicative signal value;

second arithmetic means for deriving second wheel acceleration indicative data with respect to a respective one of said first, second and third wheels on the basis of a respectively corresponding one of said first, second and third wheel speed indicative signals, said first arithmetic means being provided a second lower sensitivity with respect to variation of said wheel speed indicative signal value;

third arithmetic means for selecting one of said first, second and third wheel speed indicative signals having the greatest value, integrating said longitudinal acceleration indicative signal values and deriving vehicle body speed representative data on the basis of said selected wheel speed indicative signal value and the integrated value;

fourth arithmetic means processing said longitudinal acceleration indicative signal for detecting a friction condition on the road surface so as to select one of said first and second wheel acceleration indicative data for outputting selected wheel acceleration indicative data; and fifth arithmetic means, receiving said wheel speed indicative data, said selected wheel acceleration indicative data and said vehicle body speed representative data for processing the input data for selecting one of a first mode in which said pressure control valve means is operated in a first mode position, a second mode in which said pressure control valve means is operated in a second mode position and a third mode in which said pressure control valve is operated in a third mode position.

15. An anti-skid brake control system as set forth in claim 14, wherein said fifth arithmetic means derives an anti-skid control signal for said pressure control valve means for operating the latter in one of said first, second and third modes to order said third mode in response to selected wheel acceleration smaller than or equal to a predetermined deceleration threshold, to order said second mode in response the wheel slippage greater than or equal to a predetermined wheel slippage threshold, to order said third mode when wheel acceleration is greater than or equal to a predetermined acceleration threshold, and to order said first mode when wheel slippage is smaller than said wheel slippage threshold and said wheel acceleration is smaller than said wheel acceleration threshold and greater than said wheel deceleration threshold.

16. An anti-skid brake control system as set forth in claim 15, wherein said fourth sensor means produces said longitudinal acceleration indicative signal serving as a friction indicative signal which has a value varying between a high level representing a high friction condition and a low level representing a low friction condition, and said third arithmetic means selecting said first wheel acceleration indicative data in response to a high level friction indicative signal and selecting said second wheel acceleration indicative data in response to a low friction indicative signal.

17. An anti-skid brake control system as set forth in claim 16, wherein said third arithmetic means compares said longitudinal acceleration indicative signal with a predetermined longitudinal acceleration threshold to produce said high level friction indicative signal when said longitudinal acceleration indicative signal is greater than or equal to said longitudinal acceleration threshold and to produce said low level friction indicative signal otherwise.

18. An anti-skid brake control system as set forth in claim 16, wherein said third arithmetic means includes an averaging means receiving said longitudinal acceleration indicative signal to derive a running average of said longitudinal acceleration indicative signal values and comparing said running average with a predetermined threshold for producing said high level friction indicative signal when said running average is greater than or equal to said threshold and for producing said low level friction indicative signal when said running average is smaller than said threshold.

19. An anti-skid brake control system as set forth in claim 14, wherein said fifth arithmetic means derives an anti-skid brake control signal selecting one of each of said first, second and third modes for operating said pressure control valve to a corresponding one of said first, second and third mode positions according to the following sequence, said fifth arithmetic means deriving said anti-skid brake control signal to order said third mode in response to decreasing of wheel acceleration across a predetermined deceleration threshold, to order said second mode in response to increasing of wheel slippage across a predetermined wheel slippage threshold, to order said third mode in response to increasing wheel acceleration across a predetermined acceleration threshold, and to order said first mode in response to decreasing wheel slippage across said vehicle body speed representative data.

* * * * *